United States Patent
Gusler et al.

(10) Patent No.: US 7,984,251 B2
(45) Date of Patent: *Jul. 19, 2011

(54) AUTONOMIC STORAGE PROVISIONING TO ENHANCE STORAGE VIRTUALIZATION INFRASTRUCTURE AVAILABILITY

(75) Inventors: Carl Phillip Gusler, Austin, TX (US); Rick Allen Hamilton, II, Charlottesville, VA (US); James Wesley Seaman, Falls Church, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/419,096

(22) Filed: Apr. 6, 2009

(65) Prior Publication Data
US 2009/0193110 A1    Jul. 30, 2009

Related U.S. Application Data

(63) Continuation of application No. 11/122,623, filed on May 5, 2005, now Pat. No. 7,523,273.

(51) Int. Cl.
*G06F 12/00* (2006.01)
*G06F 13/00* (2006.01)
*G06F 13/28* (2006.01)
*G06F 15/173* (2006.01)

(52) U.S. Cl. ............... 711/154; 711/E12.016; 709/226
(58) Field of Classification Search .................. None
See application file for complete search history.

(56) References Cited

U.S. PATENT DOCUMENTS

| | | |
|---|---|---|
| 6,202,100 B1 | 3/2001 | Maltby et al. |
| 6,587,467 B1 | 7/2003 | Morgenstern et al. |
| 6,654,831 B1 | 11/2003 | Otterness et al. |
| 6,959,265 B1 | 10/2005 | Candela et al. |
| 7,499,980 B2 | 3/2009 | Gusler et al. |
| 7,523,273 B2 | 4/2009 | Gusler et al. |
| 2002/0007350 A1 | 1/2002 | Yen |
| 2002/0062285 A1 | 5/2002 | Amann et al. |

(Continued)

FOREIGN PATENT DOCUMENTS

JP     2003067276 A2     3/2003

(Continued)

OTHER PUBLICATIONS

"SANSymphony Open Storage Networking Platform", http://www.datacore.com/flash/manage.html (flash presentation).

(Continued)

*Primary Examiner* — Shane M Thomas
*Assistant Examiner* — Ralph A Verderamo, III
(74) *Attorney, Agent, or Firm* — Yee & Associates, P.C.; Mark C. Vallone

(57) ABSTRACT

The invention is an improvement to a storage virtualization system that enables the system to determine a class of service for potential storage devices and allows a user, administrator, or application to select a minimum class of service for any given type of data. The class of service is based upon factors that reflect a potential storage device's reliability, such as the device type and historical uptime data. In a P2P environment, the class of service also includes additional factors, such as the type of attached processing unit and the type of operating system running the attached processing unit.

11 Claims, 2 Drawing Sheets

U.S. PATENT DOCUMENTS

| | | | |
|---|---|---|---|
| 2002/0103969 A1 | 8/2002 | Koizumi et al. | |
| 2002/0144076 A1* | 10/2002 | Yamamoto et al. | 711/202 |
| 2002/0162109 A1 | 10/2002 | Shteyn | |
| 2003/0131044 A1 | 7/2003 | Nagendra et al. | |
| 2003/0152034 A1 | 8/2003 | Zhang et al. | |
| 2003/0158958 A1 | 8/2003 | Chiu | |
| 2003/0182428 A1 | 9/2003 | Li et al. | |
| 2004/0199566 A1* | 10/2004 | Carlson et al. | 709/201 |
| 2004/0243692 A1 | 12/2004 | Arnold et al. | |
| 2006/0236061 A1* | 10/2006 | Koclanes | 711/170 |

FOREIGN PATENT DOCUMENTS

| | | |
|---|---|---|
| WO | 00/41510 A2 | 7/2000 |
| WO | 01/61495 A1 | 8/2001 |
| WO | 02/058453 A2 | 8/2002 |
| WO | 03/041397 A1 | 5/2003 |
| WO | 03/075168 A1 | 9/2003 |

OTHER PUBLICATIONS

Birman et al., "Preface", IBM Systems Journal, 2003, vol. 42, No. 2, pp. 203-204.

Azagury et al., "Advanced Functions for Storage Subsystems: Supporting Continuous Availability", IBM Systems Journal, 2003, vol. 42, No. 2, pp. 268-279.

Kaczmarski et al., "Beyond Backup Toward Storage Management", IBM Systems Journal, 2003, vol. 42, No. 2, pp. 322-336.

Green et al., "A Perspective on Advanced Peer-Peer Networking", IBM Systems Journal, 2003, vol. 26, No. 4, pp. 414-428.

Cox et al., "Samsara: Honor among thieves in peer-to-peer storage", Oct. 2003, ACM. pp. 1-13.

Dingledine et al., "The Free Haven Project" Distributed anonymous storage service, Dec. 17, 2000, pp. 1-23.

Muthitacharoen et al., "Ivy: A Read/Write Peer-to-Peer File System", Dec. 2002, USENIX Association, pp. 1-14.

Javidan et al., "vanDisk: An Exploration in Peer-to-Peer Collaborative Back-up Storage",20th IEEE Canadian Conference on Electrical and Computer Engineering, Vancouver, BC, Apr. 2007 , pp. 1-4.

Ho et al., "Single I/O Space for Scalable Cluster Computing",IWCC '99 Proceedings of the 1st IEEE Computer Society International Workshop on Cluster Computing 1999, pp. 1-9.

Adya et al., "FARSITE: Federated, Available, and Reliable Storage for an Incompletely Trusted Environment", OSDI '02 Proceedings of the 5th symposium on Operating systems design and implementation, 2002, pp. 1-14.

USPTO office action for U.S. Appl. No. 11/122,623 dated Apr. 30, 2007.

USPTO Final office action for U.S. Appl. No. 11/122,623 dated Oct. 26, 2007.

USPTO office action for U.S. Appl. No. 11/122,623 dated Apr. 11, 2008.

USPTO Final office action for U.S. Appl. No. 11/122,623 dated Sep. 8, 2008.

USPTO Notice of allowance for U.S. Appl. No. 11/122,623 dated Dec. 8, 2008.

USPTO office action for U.S. Appl. No. 10/992,281 dated Apr. 29, 2008.

USPTO Notice of allowance for U.S. Appl. No. 10/992,281 dated Oct. 21, 2008.

USPTO office action for U.S. Appl. No. 12/175,289 dated Nov. 5, 2010.

* cited by examiner

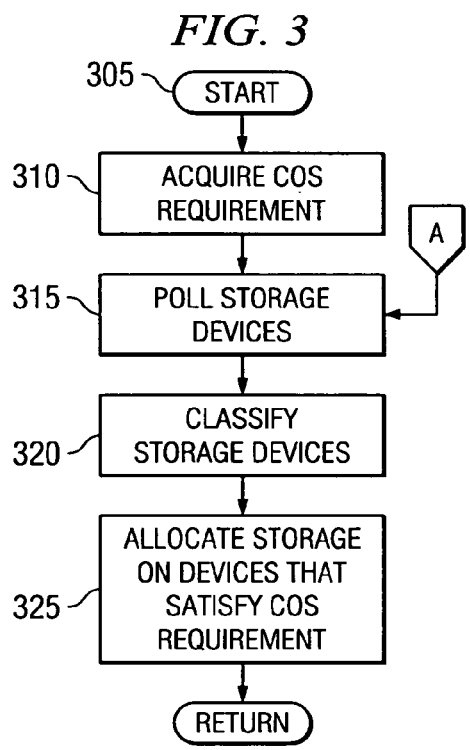
*FIG. 3*
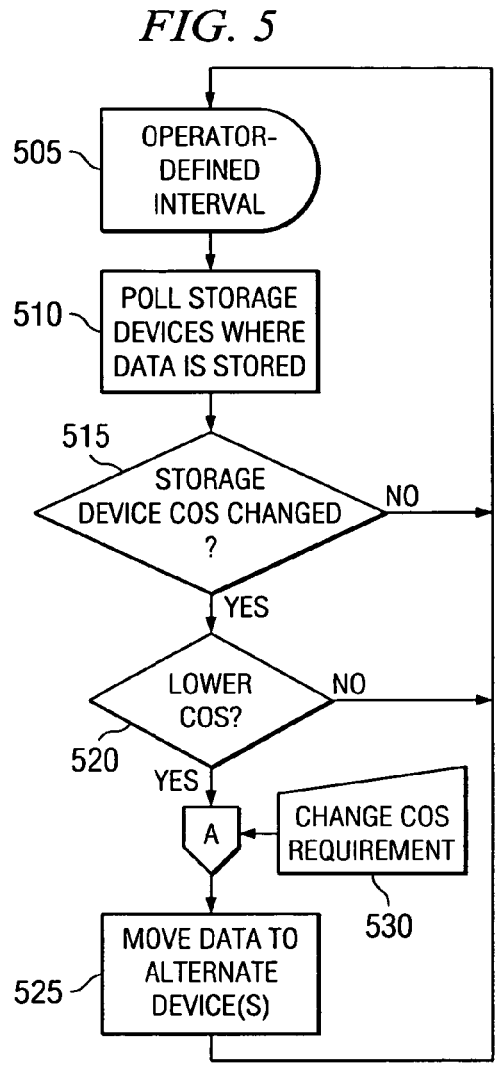
*FIG. 5*
*FIG. 4*
| COS | OPERATING SYSTEM | % UPTIME | HARDWARE | RAID LEVEL |
|---|---|---|---|---|
| BRONZE | WINDOWS NON-SERVER | <= 90 | LAPTOP/DESKTOP | NONE, RAID0, RAID1 |
| SLIVER | LINUX/WINDOWS SERVE | 90 TO 95 | DESKSIDE | RAID0, RAID3 |
| GOLD | UNIX/LINUX | 95 TO 99 | INTEL SERVER/ UNIX SERVER | RAID5, RAID6 |
| PLATINUM | OS390/UNIX | >= 99 | MAINFRAME | RAID10 |

AUTONOMIC STORAGE PROVISIONING TO ENHANCE STORAGE VIRTUALIZATION INFRASTRUCTURE AVAILABILITY

CROSS-REFERENCE TO RELATED APPLICATION

The present invention is related to the subject matter of U.S. patent application Ser. No. 10/922,281, incorporated herein by reference.

FIELD OF THE INVENTION

The invention is related generally to data processing apparatus and corresponding methods for storing data as computer files, wherein the apparatus comprises a plurality of spatially distributed computers and storage devices, and wherein the methods include transferring the data between spatially distributed computers and storage devices to effect the storage.

This application is a continuation of application Ser. No. 11/122,623, filed May 5, 2005, status pending.

BACKGROUND OF THE INVENTION

Most data processing systems in use today include some form of storage sub-system. In a personal computer, the storage sub-system often consists of nothing more than a single storage medium, such as a magnetic disk, attached to a circuit board in the central processing unit, which controls access to the storage medium. In more complex enterprise data processing systems, the storage sub-system may comprise numerous, diverse storage devices. For many years it was common practice for each such storage device to be attached to and controlled by a single processing unit, or "server," which serviced other units through a network connection. Such a network of storage servers is commonly referred to as a storage area network, or SAN. Although other units could potentially access any given storage device through the attached server, this architecture creates many single points of failure and physically limits storage expansion. In recent years, though, storage virtualization techniques have emerged that allow a data processing system to divorce storage devices from the bonds of a single processing unit. In a virtual storage system, dedicated software assumes storage management responsibilities traditionally reserved for the operating system of an attached processing unit. But this dedicated software also assumes additional responsibilities, including responsibility for creating and managing "logical storage volumes." Hence, this dedicated software is sometimes referred to as a "storage volume controller (SVC)." Unlike conventional storage devices, a logical storage volume may span many physical storage devices, even if no constituent storage device is attached to a central processing unit. The SVC implements a virtual interface so that a logical storage volume looks like any other conventional storage device to the other components of a data processing system, regardless of the composition or configuration of the underlying physical storage hardware. Moreover, the composition and configuration of the underlying physical storage hardware can change at any time, while the virtual interface insulates the other components from the physical changes. And while most of the preceding discussion presumes that the SVC's virtual interface replaces a server in a SAN, U.S. patent application Ser. No. 10/922,281 clearly demonstrates that storage virtualization technology also can be applied to peer-to-peer (P2P) networks.

Advanced storage virtualization technologies also attempt to manage network bandwidth to provide a predictable quality of service for priority users, and some provide additional storage to the data processing system on demand. To take advantage of such features, though, an administrator must specify threshold requirements and reserve resources in advance. An administrator also must update storage requirements manually, and must add storage to the SAN manually before the storage virtualization system can provide storage on demand. These auto-provisioning techniques are not suitable for SVCs in a P2P network, since such a network is decentralized and no single user has sufficient access or control to administer the auto-provisioning requirements.

The cost and reliability of storage devices can vary widely, but all inevitably fail at some point during their service life. In practice, particularly in an enterprise context, some types of data often are deemed more critical than other types, and resources can be maximized by balancing the importance of the data with the cost and reliability of potential storage devices. Current storage virtualization technologies provide an effective means for integrating numerous, diverse storage devices into a coherent and robust storage system, but no available system yet addresses this need to match data with a storage device that is appropriate to the importance of the data.

SUMMARY OF THE INVENTION

The invention is an improvement to a storage virtualization system that enables the system to determine a class of service for potential storage devices and allows a user, administrator, or application to select a minimum class of service for any given type of data. The class of service is based upon factors that reflect a potential storage device's reliability, such as the device type and historical uptime data. In a P2P environment, the class of service also includes additional factors, such as the type of attached processing unit and the type of operating system running the attached processing unit.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 3 provides a general overview of functions implemented in the present invention that locate one or more storage devices on a network that satisfy a given class of service requirement;

FIG. 4 is an exemplary data structure that classifies service levels based upon selected characteristics of a storage device; and FIG. 5 illustrates the functions implemented in the present invention that manage the data storage after initial placement.

DETAILED DESCRIPTION OF THE PREFERRED EMBODIMENT

The principles of the present invention are applicable to a variety of computer hardware and software configurations.

The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "class of service manager (COSM)."

Figure 1:
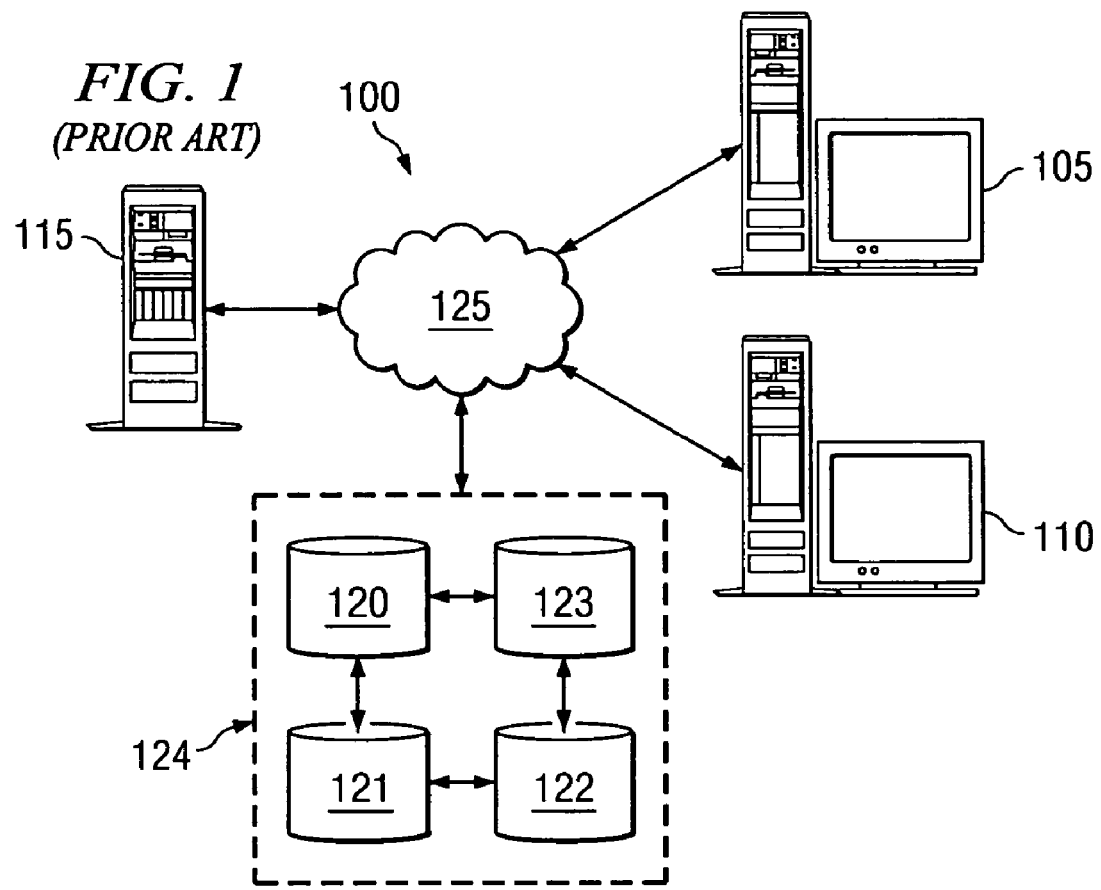
FIG. 1 represents an exemplary network of hardware devices, with which the present invention may operate.

Additionally, COSM is described below with reference to an exemplary network of hardware devices, as depicted in FIG. 1, through which COSM can transfer data from one hardware device to another. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage nodes 120-123. Persistent storage nodes 120-123 collectively represent a storage area network (SAN), labeled as SAN 124 in FIG. 1. Although not visible in FIG. 1, workstation computers 105 and 110, as well as server computer 115, each have a storage sub-system directly attached. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
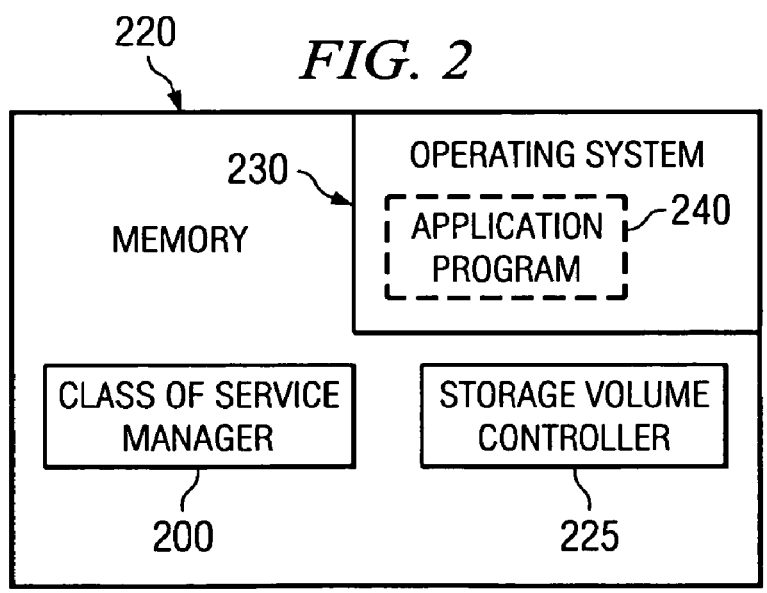
FIG. 2 is a schematic of an exemplary memory having the components of the present invention stored therein.

COSM 200 typically is stored in a memory, represented schematically as memory 220 in FIG. 2. The term "memory," as used herein, includes without limitation any volatile or persistent computer readable storage medium, such as an electrical circuit, magnetic disk, or optical disk, in which a computer can store data or software for any duration. A single computer readable memory may encompass and be distributed across a plurality of media and network nodes. Thus, FIG. 2 is included merely as a descriptive expedient and does not necessarily reflect any particular physical embodiment of memory 220. As depicted in FIG. 2, though, memory 220 may include additional data and programs. Of particular importance to COSM 200, memory 220 may include storage volume controller (SVC) 225, operating system 230 and application program 240, with which COSM 200 may interact.

FIG. 3 provides a general overview of functions implemented in the present invention, including novel functions that locate one or more storage devices on a network that satisfy a given class of service (COS) requirement. In a P2P network environment, these functions preferably are implemented as a P2P agent that cooperates with the infrastructure described in U.S. patent application Ser. No. 10/922,281, but in a conventional client/server architecture, these functions alternatively may be distributed between a client and a SAN server. For the sake of clarity, the following discussion disregards the particular distribution of code associated with the various implementations and focuses on the functions that are implemented, which are common to all implementations. Typically, COSM 200 is activated when an application program, such as application program 240, initiates an operation to save data to a persistent storage medium (305). When activated, COSM 200 first acquires the required COS (310). There are many techniques known in the art for acquiring input for a program, any of which are suitable for use in acquiring the COS requirement. Examples, though, include dialog boxes in which the operator can select or enter a required COS, acquiring the COS requirement from policy-driven logic in the application program itself, or simply using a default COS stored in a file by the operator in advance. After acquiring the COS requirement, COSM 200 polls the storage devices in the network to acquire COS characteristics from each device (315), and classifies each storage device according to the characteristics discovered in the polling process (320). Polling is a process known in the art and need not be described in detail here, but it should be clear that COSM 200 may poll all storage devices before classifying each device's service level, or may poll and classify each device individually until a satisfactory storage device is located. In yet another alternative embodiment, the storage devices themselves could be adapted to internally evaluate their own COS and provide it to COSM 200 in response to the poll, thereby shifting some of the processing load from COSM 200 and distributing it among a number of devices. Whether the processing load is placed on COSM 200 or individual storage devices, though, the classifying procedure is substantially the same. In one embodiment of the invention, an administrator or other operator provides a table or other data structure that classifies service levels based upon selected characteristics of a storage device. An example of such a table is provided in FIG. 4. Table 400 of FIG. 4 consists of a first column ("COS") that provides a label for the COS defined by the characteristics in each row of the table, and additional columns that identify the selected characteristics that define a COS. The labels included in FIG. 4 are illustrative only, and any system of labels, classes, or categories that distinguish and prioritize service levels is suitable. In table 400, the selected characteristics include the operating system ("OS"), the percentage of uninterrupted service availability ("% Uptime"), and the storage device's hardware type. The characteristics selected in table 400 are merely illustrative, and not exhaustive of the types of characteristics that can be selected. Such characteristics may vary with operator preference or network environment. An additional column in table 400 ("RAID Level") indicates the type of RAID algorithm that should be used to store data that requires the associated COS. RAID ("Redundant Array of Independent Disks") is a system of using multiple storage devices to share or replicate data among the devices. RAID is a system that is well-known in the art and need not be described in detail here. Moreover, U.S. patent application Ser. No. 10/922,281, which is incorporated herein by reference, describes in detail how to apply RAID to a P2P storage virtualization technology. Assuming for descriptive purposes that COSM 200 is responsible for classifying the storage devices, for each storage device polled, COSM 200 matches the characteristics of the storage device discovered during the polling process with a COS in the table and then assigns that COS to the storage device. For example, given table 400 in FIG. 4, if a storage device reports that it is running a LINUX operating system on INTEL hardware with a 95%-

99% uptime (i.e. uninterrupted service availability), then COSM 200 would assign a "gold" COS to the storage device. Finally, after classifying the storage devices, storage is allocated on one or more of the storage devices that satisfy (i.e. meet or exceed) the COS requirement (325), where the number of storage devices depends upon the quantity of data that must be stored and the available capacity of each storage device. Storage allocation is a function that currently is implemented in SVCs. Thus, conventional SVCs may be adapted to allocate storage only on storage devices that satisfy the COS requirement, as determined by COSM 200, or this function may be shifted to COSM 200.

FIG. 3 and the accompanying description illustrate the initial placement of data in one or more storage devices that satisfy a given COS requirement, but in practice COSM 200 operates in a dynamic environment where the COS of a storage device fluctuates and the COS requirements may change. Accordingly, COSM 200 also implements functions that manage the data storage in this dynamic environment, after the initial placement. These functions are illustrated in FIG. 5 and described below. After a given time interval (505), which may be programmed into COSM 200 or may be specified by an administrator or operator, COSM 200 again polls the storage devices in which the data was initially placed (510). If any of the selected COS characteristics have changed, COSM 200 re-classifies the storage devices (515), as described above with reference to FIGS. 3 and 4. If the COS is unchanged, then COSM 200 takes no further action until the given time interval elapses again. If the COS changes, then COSM 200 determines if the COS is lower than the original COS (520). If the COS has improved, then the storage device still satisfies the COS requirement and COSM 200 takes no further action. But if the COS has degraded, then COSM 200 polls other storage devices, classifies them, and allocates storage, as described above with reference to FIG. 3. COSM 200 then moves the data to the newly allocated storage device or devices that satisfy the COS requirement (525). Alternatively, an administrator or other operator may change the COS requirement itself (530), which also causes COSM 200 to re-poll, re-classify, and allocate storage on one or more storage devices that satisfy the new COS requirement, as depicted in FIGS. 3 and 5.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A system for storing a plurality of data in a plurality of available storage devices in a storage virtualization system, the system comprising:
   a computer having a processor connected to a network, a computer readable memory, and a computer readable tangible storage device;
   first program instructions to poll each of the plurality of available storage devices in the storage virtualization system to acquire a class of service of each of the plurality of available storage devices;
   second program instructions to compare, responsive to an operator inputting a required class of service for the plurality of data, the class of service of each of the plurality of available storage devices with the required class of service for the plurality of data; and
   third program instructions to identify a first storage device having a class of service greater than or equal to the required class of service;
   wherein the first through the third program instructions are stored in the computer readable tangible storage device for running by the processor via the computer readable memory;
   wherein each of the plurality of available storage devices internally evaluates its own class of service by polling a plurality of characteristics of itself, and comparing the plurality of characteristics to a table containing, for each class of service, a set of required characteristics, matching its plurality of characteristics to a corresponding class of service, and sending the corresponding class of service to the computer.

2. The system of claim 1 further comprising:
   fourth program instructions to identify a second storage device having a class of service greater than or equal to the required class of service;
   fifth program instructions to store a first portion of the plurality of data on the first storage device and a second portion of the plurality of data on the second storage device;
   sixth program instructions to re-poll, responsive to the operator defining a time interval for re-polling of the first storage device and the second storage device, and responsive to the time interval elapsing, the first storage device and the second storage device to acquire an updated class of service of the first storage device and an updated class of service of the second storage device respectively;
   seventh program instructions to compare the updated class of service of the first storage device and the updated class of service of the second storage device to the required class of service;
   eighth program instructions to poll, responsive to determining that the updated class of service of the first storage device is less than the required class of service, a third storage device to acquire a class of service of the third storage device; and
   ninth program instructions to move, responsive to determining that the class of service of the third storage device is greater than or equal to the required class of service, the first portion of the plurality of data from the first storage device to the third storage device;
   wherein the fourth through the ninth program instructions are stored in the computer readable tangible storage device for running by the processor via the computer readable memory.

3. The system of claim 1, further comprising:
   wherein the class of service is a single value determined by a plurality of characteristics of each of the plurality of available storage devices device, the plurality of characteristics comprising an operating system of each of the plurality of available storage devices, a percentage of uninterrupted service availability of each of the plurality of available storage devices, and a hardware type of each of the plurality of available storage devices.

4. The system of claim 1, further comprising:
   fourth program instructions to acquire a second required class of service from the operator after storing the plurality of data;
   fifth program instructions to compare the class of service of the storage devices in which the plurality of data is stored to the second required class of service; and
   sixth program instructions to move the plurality of data from the storage device in which the plurality of data is stored to one or more alternate storage devices that satisfies the second required class of service when the second required class of service is greater than the class of service of the storage devices in which the plurality of data is stored;

wherein the fourth through the sixth program instructions are stored in the computer readable tangible storage device for running by the processor via the computer readable memory.

5. The system of claim 1, further comprising:

fourth program instructions to provide a data structure that associates each class of service with the plurality of characteristics;

fifth program instructions to determine each of the plurality of characteristics possessed by each of the plurality of available storage devices; and sixth program instructions to assign to each available storage device a class of service that is associated in the data structure with the plurality of characteristics possessed by each available storage device;

wherein the fourth through the sixth program instructions are stored in the computer readable tangible storage device for running by the processor via the computer readable memory.

6. A computer program product for storing a plurality of data in a storage virtualization system, the computer program product comprising:

a computer readable storage device first program instructions to poll polling each of a plurality of available storage devices in the storage virtualization system to acquire a class of service of each available storage device;

second program instructions to compare, responsive to an operator inputting a required class of service for the plurality of data, the class of service of each of the plurality of available storage devices with the required class of service for the plurality of data; and third program instructions to identify identifying a first storage device having a class of service greater than or equal to the required class of service;

wherein the first through the third program instructions are stored in the computer readable storage device;

wherein each of the plurality of available storage devices internally evaluates its own class of service by polling a plurality of characteristics of itself, and comparing the plurality of characteristics to a table containing, for each class of service, a set of required characteristics, matching its plurality of characteristics to a corresponding class of service, and sending the corresponding class of service to a computer.

7. The computer program product of claim 6, further comprising:

fourth program instructions to identify a second storage device having a class of service greater than or equal to the required class of service;

fifth program instructions to store a first portion of the plurality of data on the first storage device and a second portion of the plurality of data on the second storage device;

sixth program instructions to re-poll, responsive to the operator defining a time interval for re-polling of the first storage device and the second storage device, and responsive to the time interval elapsing, the first storage device and the second storage device to acquire an updated class of service of the first storage device and an updated class of service of the second storage device;

seventh program instructions to compare the updated class of service of the first storage device and the updated class of service of the second storage device to the required class of service;

eighth program instructions to poll, responsive to determining that the updated class of service of the first storage device is less than the required class of service, a third storage device to acquire a class of service of the third storage device; and ninth program instructions to move, responsive to determining that the class of service of the third storage device is greater than or equal to the required class of service, the first portion of the plurality of data from the first storage device to the third storage device;

wherein the fourth through the ninth program instructions are stored in the computer readable storage device.

8. The computer program product of claim 6, further comprising:

wherein the class of service is a single value determined by a plurality of characteristics of each of the plurality of available storage devices, the plurality of characteristics comprising an operating system of said each of the plurality of available devices, a percentage of uninterrupted service availability of each of the plurality of available storage devices, and a hardware type of each of the plurality of available devices.

9. The computer program product of claim 6, further comprising:

fourth program instructions to acquire a second required class of service from the operator after storing the plurality of data;

fifth program instructions to compare the class of service of the storage devices in which the plurality of data is stored to the second required class of service; and sixth program instructions to move the plurality of data from the storage device in which the plurality of data is stored to one or more alternate storage devices that satisfies the second required class of service when the second required class of service is greater than the class of service of the storage devices in which the plurality of data is stored;

wherein the fourth through the sixth program instructions are stored in the computer readable storage device.

10. The computer program product of claim 6, further comprising:

fourth program instructions to provide a data structure that associates each class of service with the plurality of characteristics;

fifth program instructions to determine each of the plurality of characteristics possessed by each available storage device; and sixth program instructions to assign to each available storage device a class of service that is associated in the data structure with the plurality of characteristics possessed by each available storage device;

wherein the fourth through the sixth program instructions are stored in the computer readable storage device.

11. An apparatus comprising:

a computer connected to a network, a computer readable memory, and a plurality of available storage devices for storing a plurality of data in a storage virtualization system, wherein each of the plurality of available storage devices internally evaluates its own class of service by polling a plurality of characteristics of itself, and compares the plurality of characteristics to a table containing, for each class of service, a set of required characteristics, matching its plurality of characteristics to a corresponding class of service, and sends the corresponding class of service to the computer.

* * * * *